United States Patent [19]

Danby et al.

[11] Patent Number: 5,551,011
[45] Date of Patent: Aug. 27, 1996

[54] COMPUTERIZED SYSTEM FOR SIMULATING PAPER SHEET FORMATION AND THE APPEARANCE OF PRINT THEREON

[75] Inventors: Roger Danby, Arnprior, Canada; Alain Bouchard, Raleigh, N.C.

[73] Assignee: Huyck Licensco, Inc., Wilmington, Del.

[21] Appl. No.: 189,120

[22] Filed: Jan. 27, 1994

[51] Int. Cl.$^6$ ................................ G06G 7/48; G06F 3/00
[52] U.S. Cl. ............................................ 395/500; 364/578
[58] Field of Search .................... 395/500, 578, 395/140, 142, 161, 130, 164, 162, 800, 117; 364/191, 468, 470, 147, 413.26, 192, 151–156, 524; 358/507, 534, 527; 434/219, 218; 162/263, 351; 73/61.62, 61.64, 61.67, 1.59, 150 R; 355/38, 69, 77

[56] References Cited

U.S. PATENT DOCUMENTS

| | | | |
|---|---|---|---|
| 3,767,900 | 10/1973 | Chao et al. | 364/151 |
| 3,788,137 | 1/1974 | Lyon et al. | 73/159 |
| 3,992,100 | 11/1976 | Lodzinski et al. | 364/524 |
| 4,308,553 | 12/1981 | Roetling | 358/507 |
| 4,616,217 | 10/1986 | Nesbitt et al. | 395/127 |
| 4,812,879 | 3/1989 | Suzuki | 355/38 |
| 4,914,568 | 4/1990 | Kodosky et al. | 395/155 |
| 4,933,979 | 6/1990 | Suzuki et al. | 382/173 |
| 4,984,181 | 1/1991 | Kliman et al. | 395/130 |
| 5,016,183 | 5/1991 | Shyong | 395/130 |
| 5,027,196 | 6/1991 | Ono et al. | 358/527 |
| 5,097,427 | 3/1992 | Lathrop et al. | 395/130 |
| 5,314,581 | 5/1994 | Lin et al. | 162/263 |
| 5,371,851 | 12/1994 | Pieper et al. | 395/164 |

OTHER PUBLICATIONS

"The Propagation of Light in Paper: Modelling and Monte Carlo Simulations" authored by J. Carlsson et al., pp. 83–86 of the *1995 International Paper Physics Conference*, held Sep. 11–14, 1995.

*Primary Examiner*—Kevin J. Teska
*Assistant Examiner*—Jacques Louis-Jacques
*Attorney, Agent, or Firm*—Lorusso & Loud

[57] ABSTRACT

To provide a simulation of the formation of a sheet of paper and the appearance of print thereon, a computerized system is adapted to receive input parameters related to a type of headbox stock desired, the fabric upon which the paper is to be formed, the paper machine to be used, and the printing process desired. Data relating to the actual production of paper is configured to simulate a series of fibres being dropped onto the surface of the fabric to create a mat. After a sufficient amount of fibre has been simulated as being dropped onto the fabric creating a fibrous mat, the system will indicate a final sheet has been completed when it has the desired basis weight as initially inputted by the user. After a final sheet of paper is deemed finished a report pertaining to sheet characteristics is generated. The report provides the user with data relating to fibre retention, a display of the simulated sheet along with its density variations, surface characteristics, and structure. The system, adapted to accept data relating to the type of printing process, configures such data with that already inputted, so as to provide a simulation of ink printing on the simulated sheet. The user thus has a visual output representative of the quality that a final physical sheet of paper would possess after manufacture and printing thereon.

30 Claims, 7 Drawing Sheets

COMPUTERIZED SYSTEM FOR SIMULATING PAPER SHEET FORMATION AND THE APPEARANCE OF PRINT THEREON

FIELD OF THE INVENTION

The present invention relates to a computerized system for simulating the formation of a fibrous sheet and print thereon.

DEFINITIONS

A fibre is matter, natural or synthetic, of any size, shape, or weight that can be used to produce a sheet of matter.

Stock includes any liquid-fibre mixture.

A fibrous sheet or paper, includes any material which is formed from stock.

A papermaking machine is any machine that accepts stock and produces a fibrous sheet of any thickness, weight, grade, density, porosity.

A simulated representation includes any image which is virtual, uni-dimensional, multi-dimensional, digital, numerical or graphical, and exhibits characteristics that the image would possess if physically modeled.

BACKGROUND OF THE INVENTION

The goal of improving the quality of paper is shared by those in the papermaking industry. Experience enables many papermakers to gauge what is needed to produce a desirable sheet of paper with enhanced quality. However, with many stock samples now involving the use of recycled materials, other natural materials, and newly developed synthetic fibres, and with many new fabrics and machines continually emerging, the papermaking industry is considering unchartered methods in which to make paper of enhanced quality.

In lieu of such opportunity, the gamble of increased costs looms apparent. Not all of such new methods produce a desirable output, and some methods are not worth the expense of experimentation. For instance, some stock samples may have fibres of too short a length to use with a certain fabric. Likewise, some machines produce sheets of inferior quality when used with incompatible stock and/or fabric. Without incurring costly trial runs, the industry is currently without a method for determining the quality that a final sheet would possess if used with a new combination of stock, fabric and machine.

The need to determine the final quality of paper is particularly great for those engaged in providing paper for printing applications. In such an arena, it is important that the quality of the final sheet is suitable for printing. The printer can control the rate of absorption of ink that occurs into the sheet during the printing process, by controlling the mixture and viscosity of the ink itself. However, for any given pass through the printing press, the quality of the ink solution will remain the same and therefore, the quality of the final print will be directly related to the absorption rate of the ink from one area of the sheet to the other. This rate of absorption and the degree to which ink penetrates the sheet, is controlled by the density of the area of the sheet upon which the ink solution falls.

Differences in density on paper if great, often make the sheet flocky or cloudy, as seen when looking through the sheet, impacting on the appearance of print throughout a single sheet. The design of the headbox used in the machine and its performance have the greatest effect on sheet density. This, in combination with turbulence created by stationary elements principally dictate the final large scale sheet formation. Additionally, wire marks on the final sheet caused by the structure of the forming fabric on which the sheet was produced, explain the finer levels of density differences on the paper.

In order to determine density differences, the papermaker must analyze the final product after it has been produced on the machine or after it has gone through the printing phase. Such a method of determining density variations is often costly and does not provide a clear indication of where the problem lies. The papermaker must separately modify those variables such as stock, fabric and even the machine used, until achieving the perfect formation for uniform density. This further increases the cost incurred by the papermaker, which is eventually passed on to the consumer.

SUMMARY OF THE INVENTION

It is therefore an object of the invention to simulate the formation of a paper sheet so as to enable a user to view the quality of paper prior to the manufacturing thereof.

It is a further object of the invention to engineer the production of paper and the printing thereon, by allowing the user to view a simulation of a final sheet of printed paper and modify in accordance with quality desired, the parameters configured to obtain the sheet.

It is still another object of the invention to determine the percentage of fibres from a headbox stock which have been retained in a sheet of paper.

It is still another object of the invention to determine the distribution of fibres on a sheet of paper.

It is yet another object of the invention to determine the density variations within a sheet of paper.

It is still another object of the invention to determine the surface characteristics of a sheet of paper.

It is still another object of the invention to determine the structure of a sheet of paper.

It is yet another object of the invention to determine the uniformity of gloss provided by ink on a sheet of paper.

It is a further object of the invention to determine the degree of ink penetration on a sheet of paper.

It is a final object of the invention to determine the degree of ink strike-through on a sheet of paper.

These and other objects of the invention are carried out by a computerized system for simulating the production of a paper sheet. The interactive system is adapted to receive input parameters related to a type of headbox stock desired, the fabric upon which the paper is to be formed, along with the paper machine and printing process desired, so as to provide a simulation of the formation of a sheet of paper along with the print quality provided thereby. Data relating to the actual production of paper is configured with the other set parameters so as to simulate a series of fibres being dropped onto the surface of the fabric so as to make a determination regarding whether there is sufficient support for each fibre to be retained. After a sufficient amount of fibre has been simulated as being dropped onto the fabric creating a fibrous mat of the same weight and the same density differences as the desired end product, a final sheet of paper is deemed finished and a report on sheet characteristics is generated. The user is then provided with data relating to fibre retention, a display of the simulated sheet along with its density, surface characteristics, and structure. The system, adapted to accept data relating to the type of printing process, configures such data with that already inputted, so as to provide a simulation of ink printing on the simulated sheet. The user thus has a visual output representative of the quality that a final physical sheet of paper would possess after manufacture and printing.

DETAILED DESCRIPTION OF THE INVENTION

Figure 1:
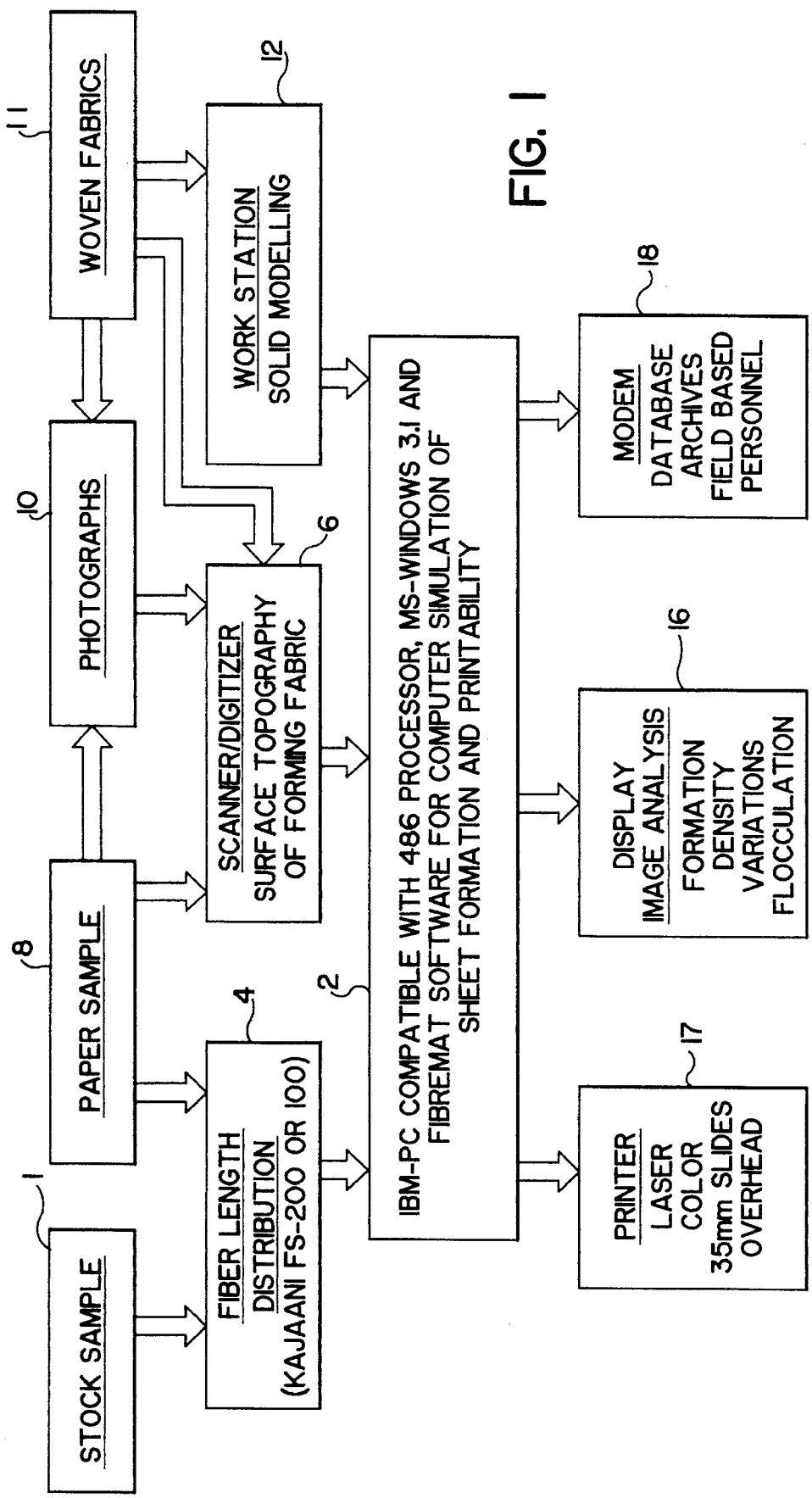
FIG. 1 shows a block diagram of the system hardware.

FIG. 1 discloses a block diagram of the hardware used in the system of the instant invention. The program preferably operates on an IBM PC-compatible computer 2 with keyboard for data entry, with a 25 MHz 80486 processor or higher, having an extended memory of 4 Mb. The simulation program runs under MS-WINDOWS 3.1™, an enhanced graphic program produced by Microsoft Corporation, with the code preferably written with Object Oriented Programming in Turbo Pascal for WINDOWS™. The program accepts inputs from various units. A Kajaani FS-200 Fibre Length Analyzer™, 4 produced by Kajaani Automation a member of the Valmet Automation Group, to be described in further detail below, provides data regarding the stock 1 or paper sample 8 used in the simulation application. Additionally the system may comprise a scanner/digitizer 6 for inputting the surface topography of the fabric to be used in the analysis, by accepting a photograph 8 or paper sheet 10 displaying such. Additionally, a work station 12 is provided wherein the user inputs the parameters needed for the simulation application, one of such being the characteristics of the fabric 14 on which the paper is to be formed, so that solid modeling may be carried out if needed. The display monitor 16 for providing the simulated sheet should be VGA compatible, and a mouse or other type of pointer is also useful. Peripheral devices such as a printer 17 for making hardcopies or slides, and a modem 18 for transmitting the results to another database or to field-based personnel, may be employed. Although such hardware and programming language are preferable, those skilled in the art could employ other products which perform similarly without departing from the scope of the instant invention.

The program requires the user to input the parameters needed for simulation, from the IBM-PC computer 2 and in some cases from the work station 12. Once such parameters have been inputted and the program is running, the computer 2 will generate a report, enabling the display monitor 16 to provide the user with an image of paper sheet formation, along with many of the characteristics of the final sheet, including the appearance of print thereon. Additionally, the user may obtain a hard copy of the report from the printer 17.

Figure 2A:
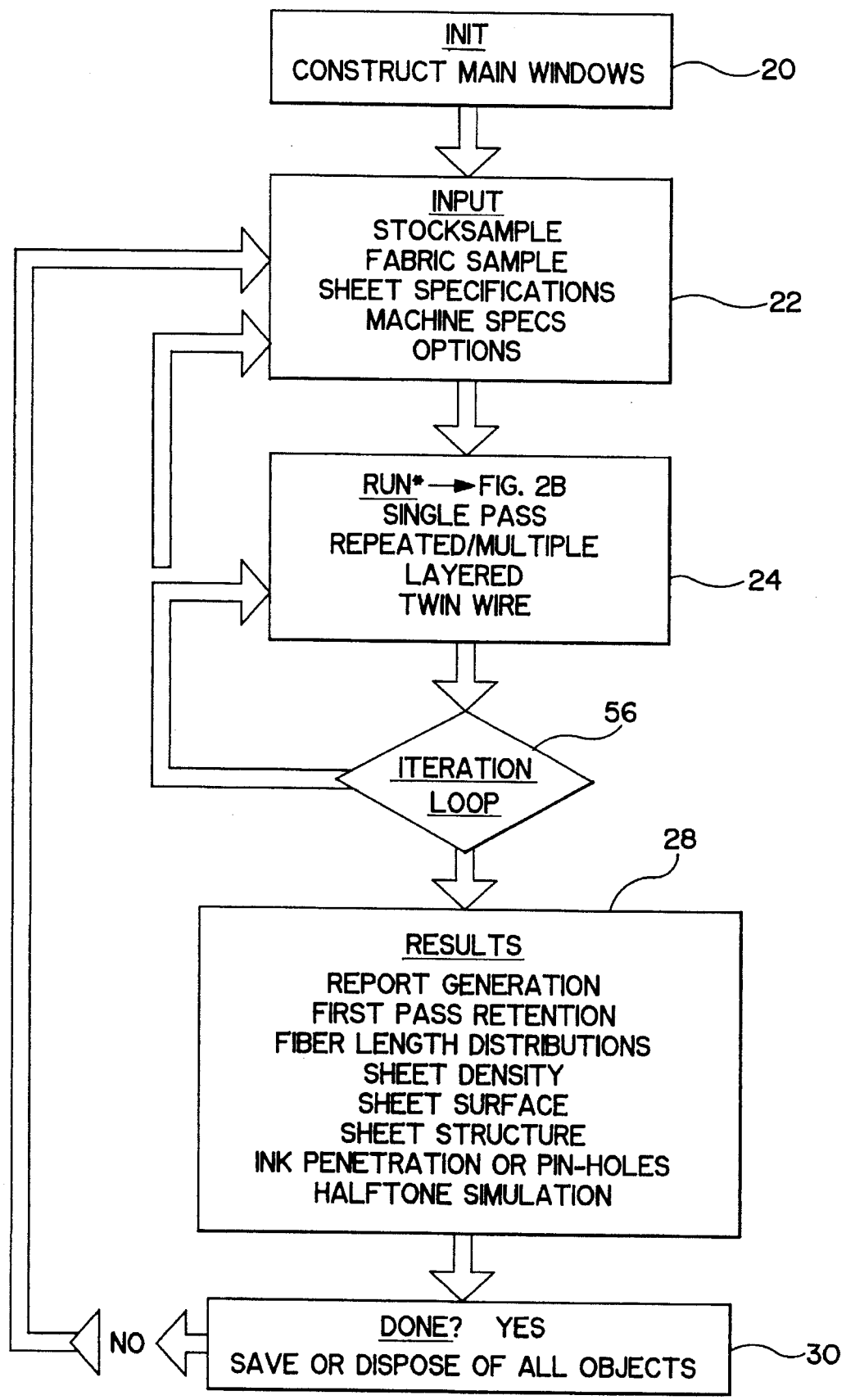
FIG. 2A shows a flow chart describing the steps which the software performs while acquiring and processing information.

FIG. 2A describes the programming sequence operating on the system hardware. As shown in block 20 the system is first initialized and the main windows are constructed. Next in block 22, the user is asked to input the type of headbox stock sample to be used, the type of fabric sample, the specifications of the sheet, and the machine specifications. Regarding the type of headbox stock, the program accepts any stock sample, be it pulp, tissue, corrugating medium, liner, finer paper or newspaper. Additionally, the user may input more than one type of stock if the paper to be produced is formed by a machine with stacked or multiple headboxes. The parameter of fibre coarseness is also inputted, and is set to be constant for all fibres in a headbox sample. Thus, the system assumes that each fibre in the sample is of the same coarsensess. Once such data relating to the headbox stock is inputted, the total fibre length distribution is recalled from that previously inputted for such stock via the Kajaani FS-200 Fibre Length Analyzer™ (hereinafter 'Kajaani'), as given in block 4 of FIG. 1.

The prior art Kajaani machine 4, is an optical instrument that digitizes the lengths of fibres in a particular stock. Using a laser light source, this instrument is able to carry out rapid and repeatable measurements with an overall resolution of 50 µm. An extremely sensitive detector measures the length of fibres at up to 100 fibres per second. Moreover, the instrument automatically determines fibre lengths in the range of 0 to 7.2 mm regardless of what is set. The stock samples are obtained from the headbox of a machine to be simulated and then tested with this instrument. Outputs relating to the upper and lower limit of fibre lengths, the arithmetic average, the total fibres in a headbox stock sample 1, fibre lengths, and the percentage such lengths comprise in the whole of the stock sample 1 are given. This data is transferred to the IBM-PC computer 2 such that when the user inputs the desired headbox stock sample, the distribution of fibres, that is the number of fibres of various increments of length which make up the whole of that stock sample 1, is available for use in simulating the formation of the paper sheet. Other parameters relating to the fibre shape and width are set in the system. Thus fibres are configured as ribbon shaped structures, which are 30–40 microns wide.

Additionally, in block 22, the user is required to input the fabric sample upon which the paper is to be made. This may be carried out by sending a paper 8 or photograph 10 having the fabric design thereon, through the scanner/digitizer 6. Otherwise, the work station 12 can create, by solid-modeling, a fabric according to the user's specifications. Fabric designs which may be inputted are; single layer, double layer, 'X'-pick double layer, triple-layer or any hypothetical design the user can think of. Single layer fabrics produce the coarsest paper sheets with the greatest probability of uneven density due to less fibre retention and due to the knuckles and holes in the fabric. Triple-layer fabrics are most desirable as far as providing a sheet of uniform density and smoothness. Whichever mode and fabric chosen, the input is thus sent to the computer for use in the simulation application.

Likewise the user is required to input sheet specifications such as the sheet basis weight, grade and anisotropy, which relates to the property of the direction of the fibres in the final sheet. The user is further required to input the type of paper machine that the paper is being made on. This may include a pulp machine, a fourdrinier, twin wire formers, tissue machine, and a hypothetical paper making machine. The user can further input the printing process such as rotogravure, lithogravure, letter or a hypothetical process. After all of the above parameters have been inputted, the system calculates the total fibre length from the Kajaani data, shown in block 23 of FIG. 2B, and runs the simulation program, as shown in block 24.

Figure 3A:
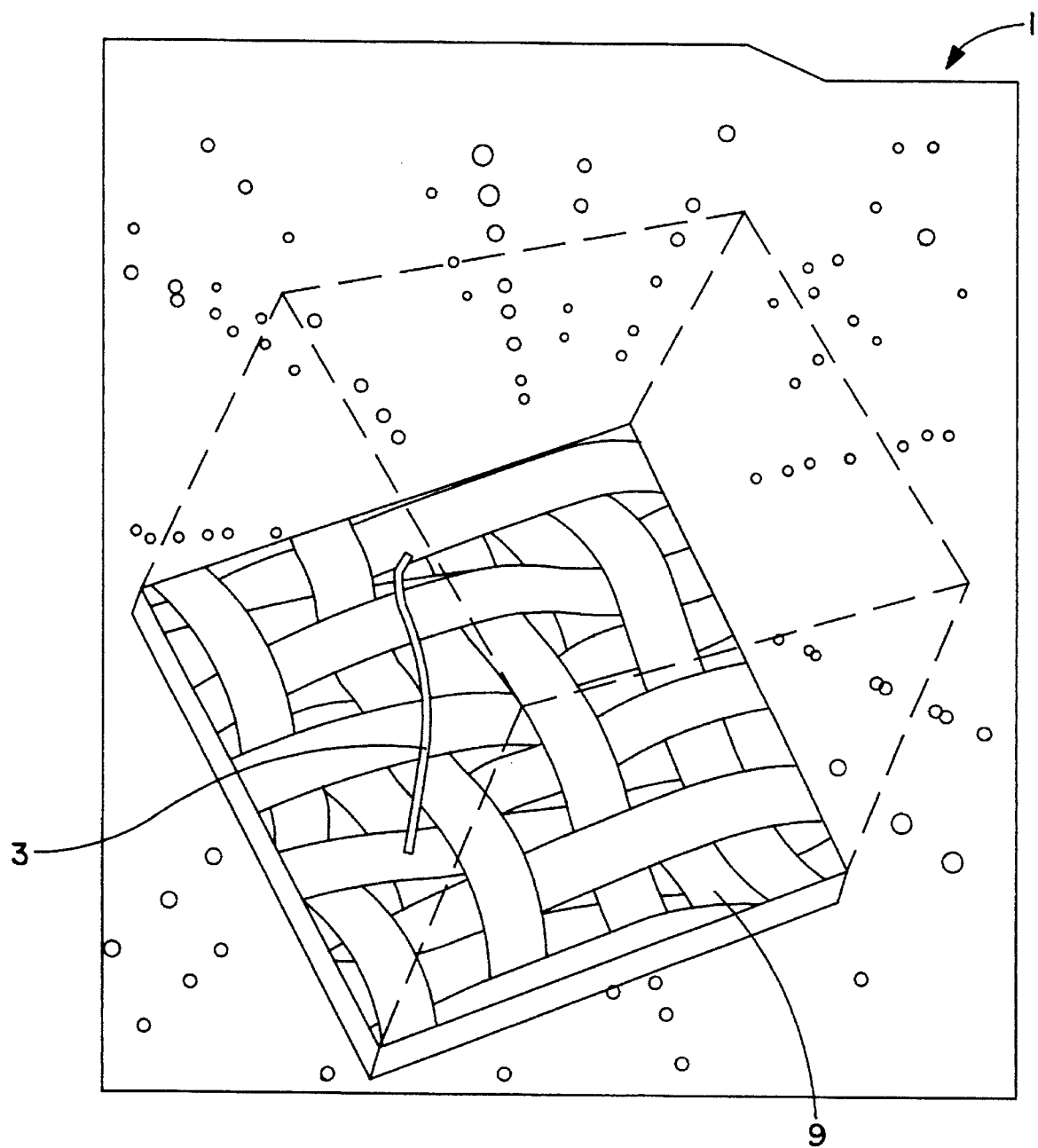
FIG. 3A shows the simulated three-dimensional workspace created by the system memory.

As shown in FIG. 3A, when the program is ran, a three dimensional workspace 1 is created in memory. This workspace has data relating to the fabric's mesh 9, and the placement of stock fibres 3 with respect thereto.

Figure 2B:
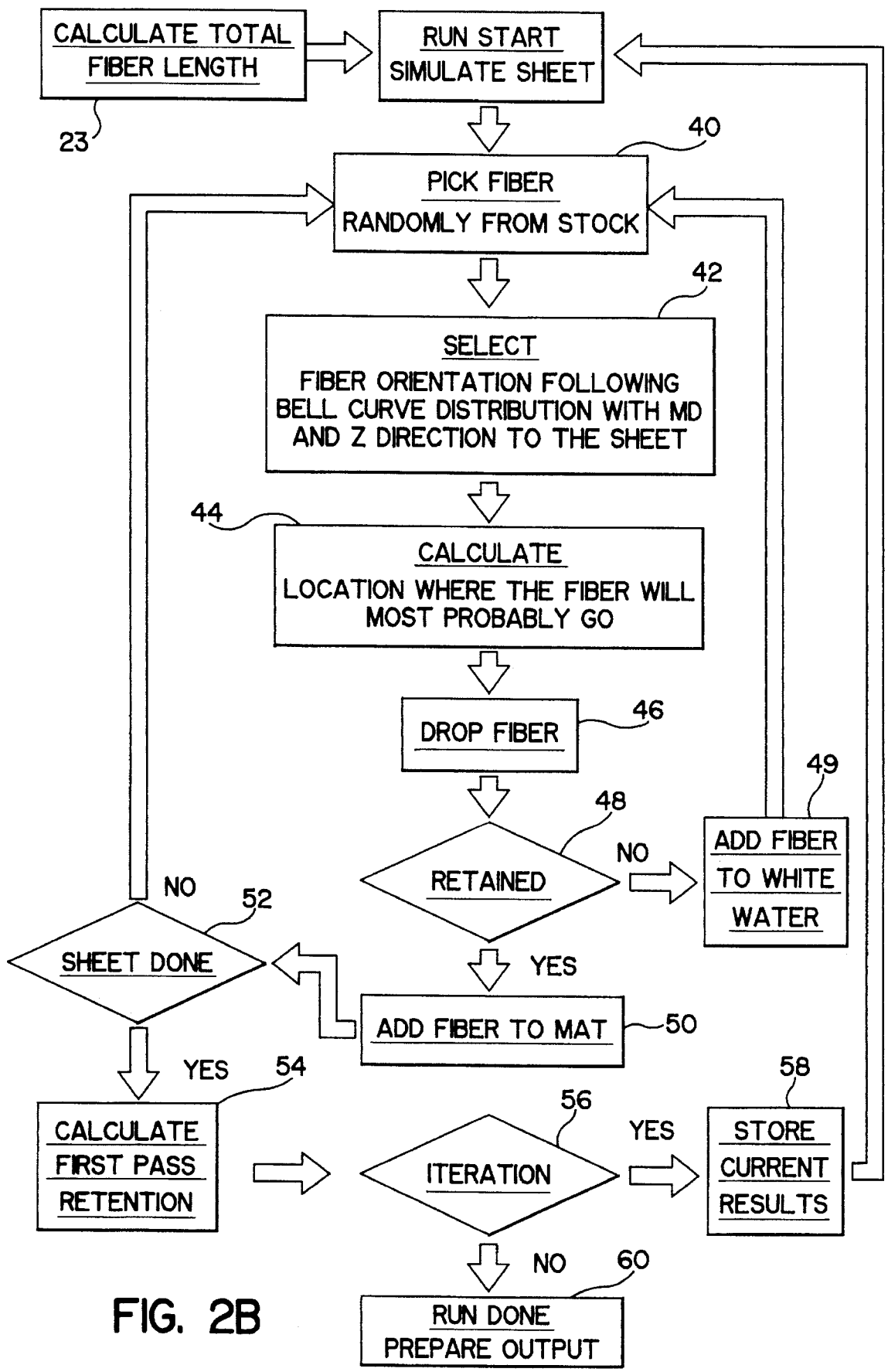
FIG. 2B shows a flow chart further describing the steps which the software performs during the actual simulation.

Now turning to FIG. 2B, for a flow chart further describing the steps which the software performs during the actual simulation, note in block 40, a fibre is first picked randomly from the stock sample defined by the Kajaani data. Next in block 42, the program selects the fibre orientation. Both machine direction and normal-to-machine direction fibre orientations are selected from either random or a definable bell curve shape. The program then calculates where the fibre will most likely lie when dropped in block 44. The probability of where the fiber will be dropped is based on a drainage function of the stock through the forming fabric. This is a statistical function which changes every time a fibre lies across a hole in the forming fabric. Thus, this function changes as a number of fibres create a fibre mat, because when a fibre is retained over a hole in a forming fabric the hole dimensions are modified, thus a single hole becomes two holes and so on. As each fibre is dropped, it creates different sized holes which have to be accounted for when subsequent fibres are dropped, as such holes change the support points.

Figure 3C:
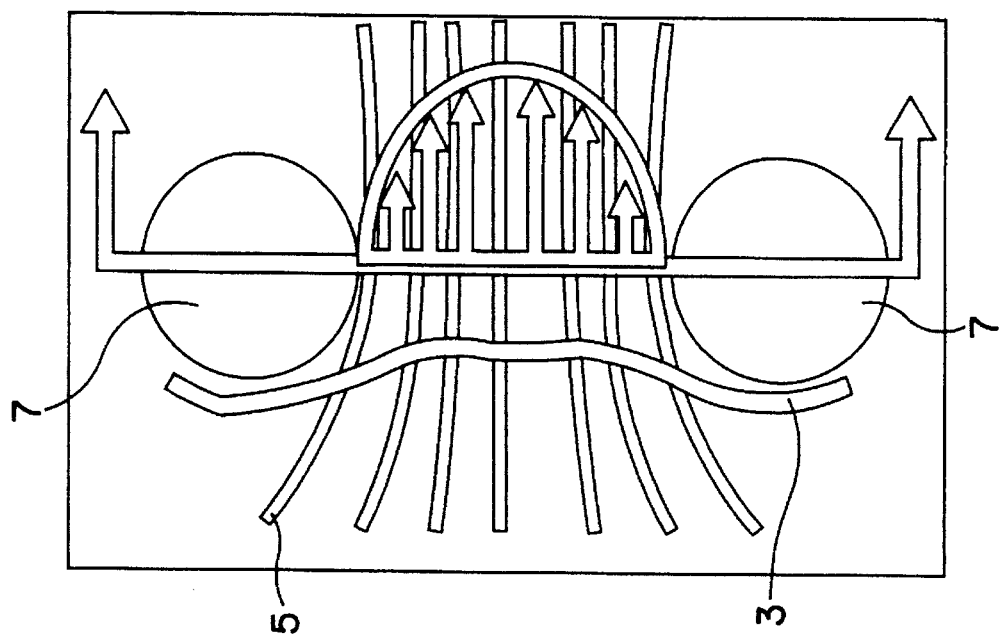
FIG. 3C shows a plan view of the location at which a fibre is dropped with respect to a drainage function and support points.
Figure 3B:
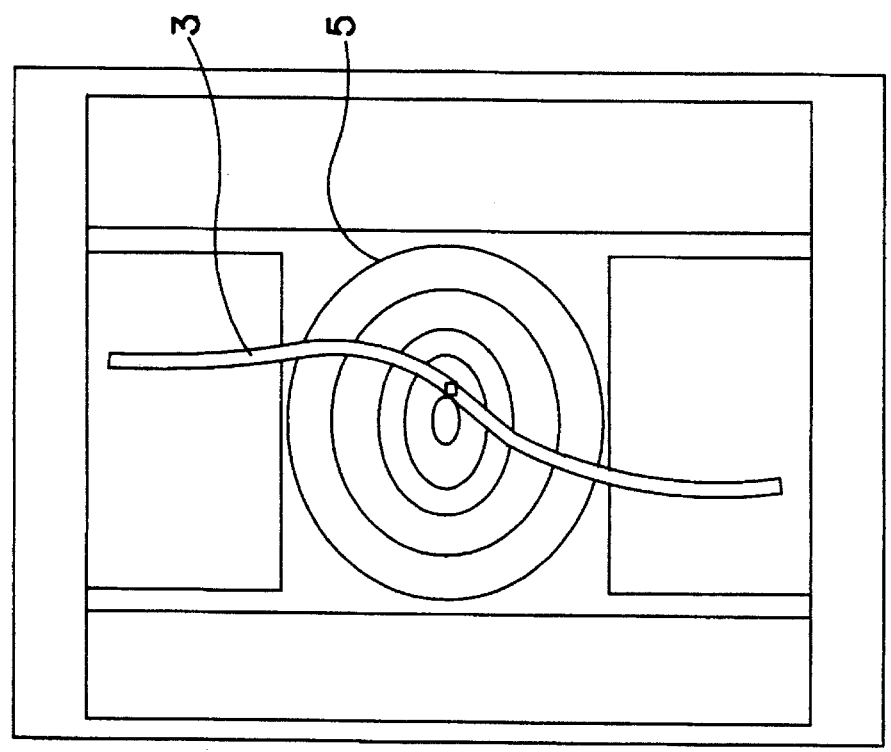
FIG. 3B shown a top view of the location that the fiber is dropped with respect to a drainage function.

The fibre is then dropped, as given by block 46, with the location where it is dropped being the most probable flow path around the mesh. Certain fibres when dropped will be held by their center, others will be held by two contact points on each side of its center of mass. This process is recorded during the simulation and can be played-back later, or represented on the reports. In FIGS. 3B and 3C, the location of the fiber 3 is shown with reference to the stock sample drainage function 5, and the support points 7. The support points 7, as stated above may be due to the fabric mesh or the mat created by previously dropped fibres.

The user may also modify the degree of support to evaluate different conditions. Based on this support information, the program will determine whether the fibre has been retained or not. The determination of fibre retention takes into account the flexible nature of the fibres, as the fibre length is modified with a function that computes the proportion of the fibre that must be supported in order to be retained. For instance, a fiber may appear to be adequately supported for retention, however, the drainage function of the stock with respect to the fabric, in combination with the flexibility of the fiber may cause the fibre to pass through a hole in the fabric. Thus, the degree of support needed for retention is determined. If the fibre is not retained, block 48 determines that it has passed through the holes in the mesh with the remainder of the white water 49, and the program returns to block 40 where another fiber is chosen. If it is retained as given in block 48, it lies on the mesh of the fabric to eventually form a mat with other fibres as shown in block 50.

Returning to the program, at block 52, after a fibre has been dropped, the program determines if the paper sheet is finished by ascertaining whether the simulated sheet matches the user's input specifications for the sheet, such as basis weight and grade. If the program determines that a paper sheet has not been completed, the program returns to block 40 and a new fibre is picked randomly from the stock. The above sequence of steps will be repeated until sufficient fibre has been dropped creating a fibrous mat of the same basis weight and grade as the desired end product initially inputted by the user. At this point, the inquiry of block 52 will be affirmative, that the paper sheet has been formed. The final simulated sheet will have the same density differences, those being heavy areas of fibre over the holes and light areas over the knuckles of the fabric, as would be expected from a sheet formed on an actual paper making machine.

Once the program determines that the paper sheet is complete, the program calculates the first pass retention, as given in block 54. This is determined by a ratio of the mass of fibers that are present in the sheet, thus those retained, divided by that were initially present in the headbox stock, as given by the Kajaani data. The higher the percentage retained, the better the quality of the paper sheet, as the likelihood of pinholes or areas of low density is significantly low when a large number of fibers make up the sheet. Regarding this determination, the user will be provided with the percentage of fibers that have been retained. Based on such information, the user will be able to modify in a later simulation application; the stock sample, the fabric, the machine, the sheet specifications, particularly if a large number of fibers are lost with the white water.

The results of a first iteration are saved in block 58 and the program returns to block 24 to run the program again. As shown at block 24 in FIG. 2A, other iterations such as a single pass iteration which provides the user with one square of the sheet, or repeated/multiple iterations which provides the user with a cumulative block or multiple blocks forming the sheet, may be performed. Likewise, an iteration to create a layered sheet formed by stacked headboxes with multiple stock samples, may be performed. Note that for a layered sheet iteration, the user is required to input more than one stock sample at block 22. Additionally, a twin wire iteration may be performed, where two different types of fabric are used as drainage is carried out on both sides of the sheet being formed. For the twin wire iteration, the user is required to input two types of fabric at block 22.

Once the desired iterations have been performed the run is finished and results are used to prepare the output, as given in block 60 of FIG. 2B. At this point a report may be generated, as each location of the fiber forming the simulated sheet has matrix data associated therewith, providing the user with the ability to dissect the characteristics of the simulated sheet in a many ways, particularly shown in block 28 of FIG. 2A.

As shown in block 28 of FIG. 2A, the user is provided with the ability to analyze and display; fibre lengths that have been retained and those that have been lost, fibre length distributions, sheet density, porosity, surface characteristics, sheet structure, ink penetration, pin-holes, halftone simulation, and two-sidedness. Regarding fibre length distributions, the user will be provided with a display of a simulated sheet showing where the longest and shortest fibres were dropped along with digital data representative of such. Additionally, the user is provided with density information to determine whether the final sheet is of uniform or uneven density. Moreover, a 'lookthrough' view is provided, having the same effect on the sheet as if it were held against a light. This view gives the user the ability to see variations in density and structure of the paper. Also regarding sheet structure, the user is also provided with the ability to rebuild the sheet in slices. Likewise, smoothness, porosity and pin holes may be calculated and viewed. Pin holes, like density variations are indicative of lack of retention in certain areas commonly due to short fiber length, or due to error in fabric choice.

Figure 4:
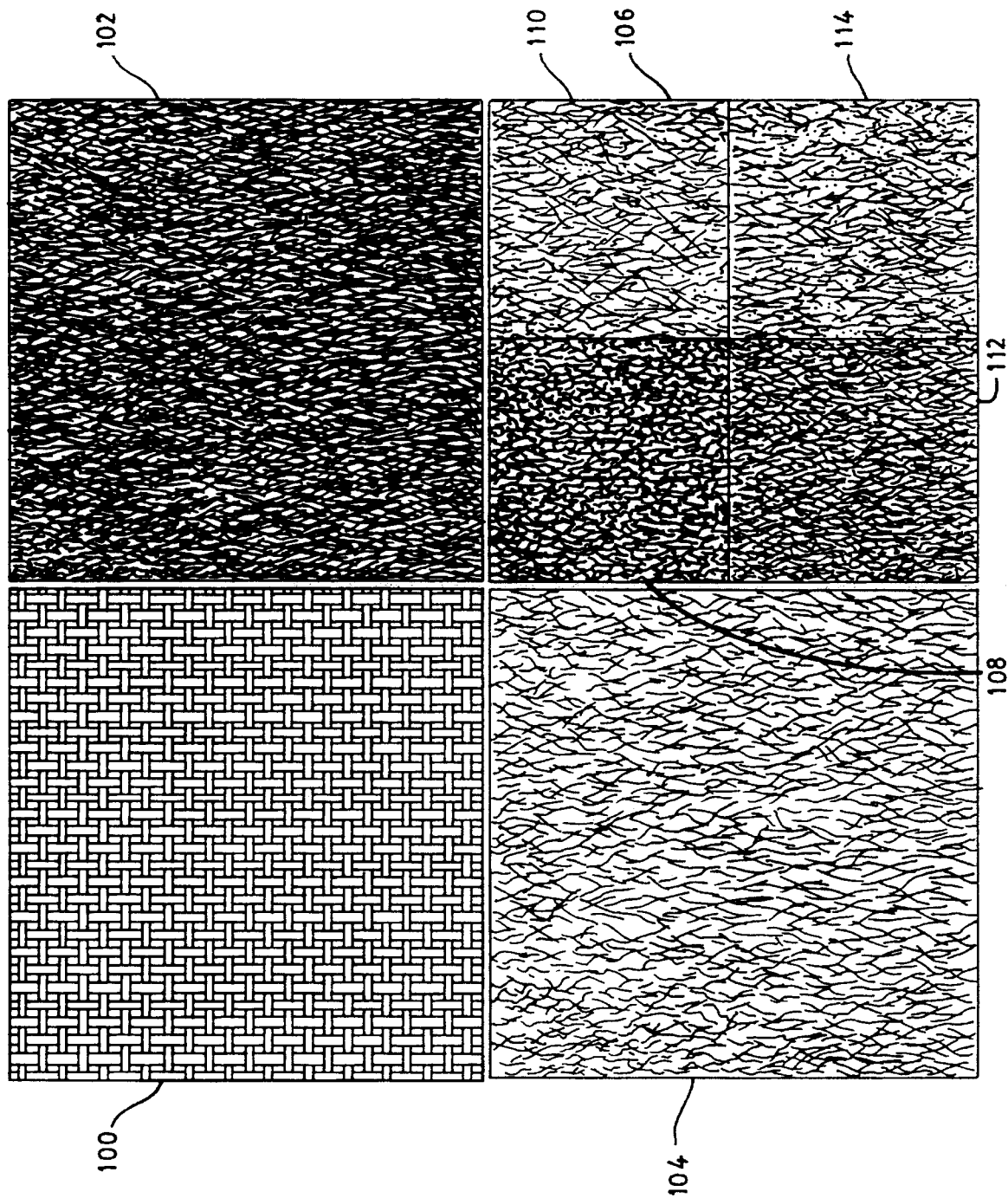
FIG. 4 shows an example of a display generated after a simulation application.

The above characteristics, determined in a trial simulation application are shown in FIG. 4. As shown in this figure, the screen of the display 10 may be divided into as many windows as desired. In this figure, the user selected four quadrants 100, 102, 104, 106 with one of quadrants 106 further split up into four quadrants 108, 110, 112, and 114. As shown in quadrant 100, the fabric surface selected is displayed for the user to see how the fabric affects the final quality of the sheet surface as shown in quadrant 102. The density of the sheet is also shown, and is important, should the user want to determine whether such sheet would lend itself well to printing. Lastly, in quadrant 106, shown are the stages in which the fibers are dropped, and how the sheet is structured as fibers are dropped. For example, in quadrant 108, we see the final sheet of paper. In quadrant 110, the user views the retention as to the first 25% of the fibers that have been dropped onto the fabric. Next, in quadrant 112, the structure of the sheet as to the percentage of fibers that complete 75% of the sheet is displayed. Lastly, in quadrant 114, the last 25% of the fibers dropped is displayed. Each quadrant provides an indication as to the fiber lengths, distribution, retention, orientation, and density to name a few.

Additionally, if the user would like to see how ink would appear on the paper sheet, the print quality of such sheet is further assessed. The user will be provided with displays relating to the uniformity of the gloss on the simulated sheet along with the degree of penetration of the ink and whether strike through occurs. Additionally provided is the ability to view a printed sheet with halftone simulation.

A number of different screens are available for use in a printing process. Each screen has a line-per-inch grid, representing ink dots per inch, which is programmed into the system. The most common is 100 lines per square inch, with the lines being lines of round holes, the diameter of which can be varied to control the total area covered by the hole versus the land area. A hole that makes up a screen controls the amount of ink that reaches the paper. The end result in the half-tone area is a dot of ink being transferred onto the sheet of paper. In order for the printer to reproduce equal quality, not only from one print to the next, but also from one minute area of the print to the next, it is important for each half tone dot to penetrate at an equal rate with respect to all others. Thus, the density of the final sheet plays a very important role. It thus follows that the user will be able to determine the correlation between the holes and the knuckles and the holes in the screen, such that the ink penetrates the areas of the sheet which will produce the most desirable print quality.

For example, the density over each 'hole' in the sheet, can be determined, then the degree of ink penetration can be simulated for that hole compared to any other hole. A dot spread simulation can also be performed. The combination of the two would then provide the user with the opportunity to predict the quality of print over each hole from the point of view of penetration strike-through, gloss and dot spread. Pin holes and large porosities will be indicative of ink penetration and strike through characteristics. Also the variation between holes can be simulated and the total affect of this variation can be determined with respect to the overall print quality.

Figure 5:
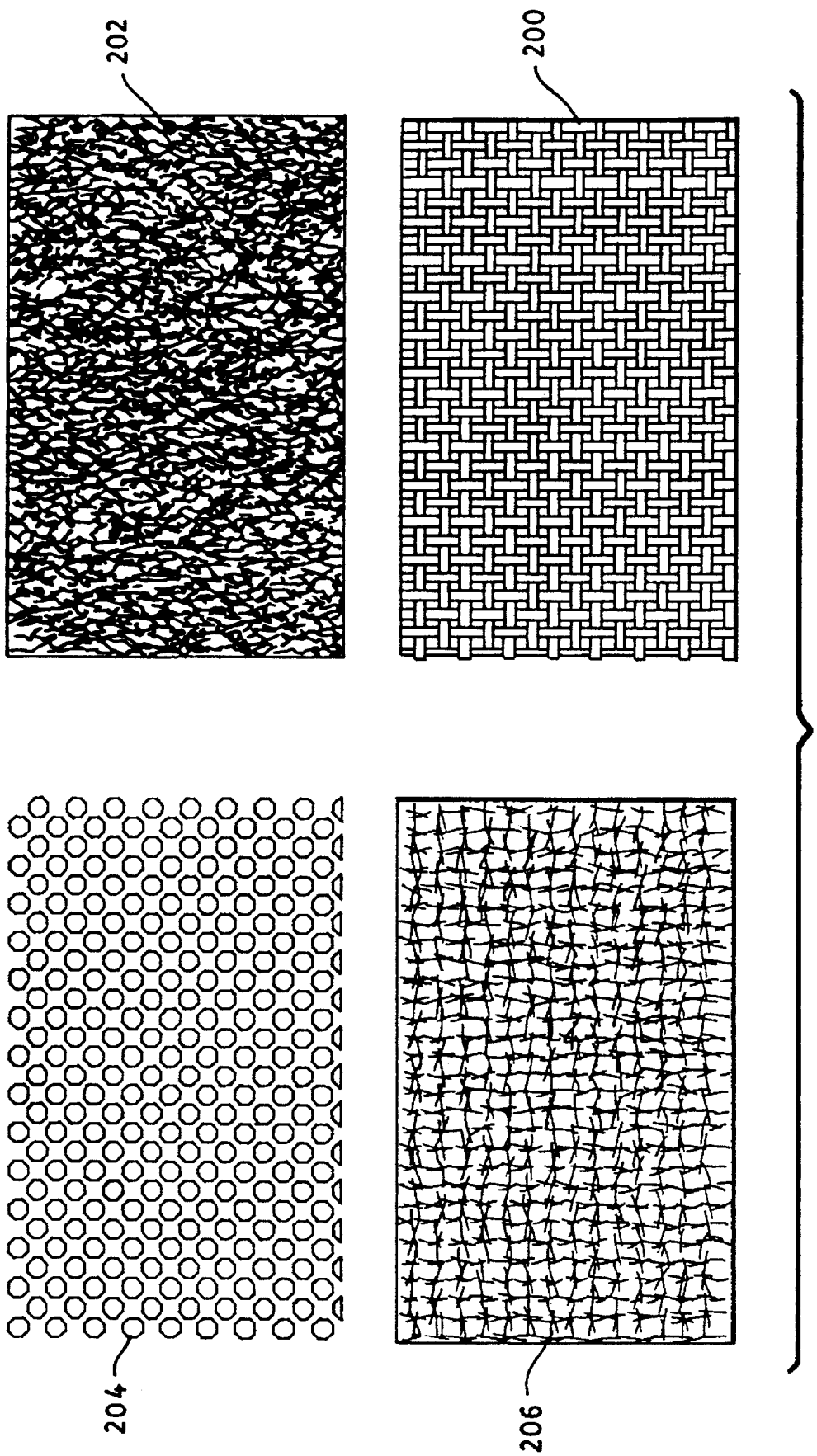
FIG. 5 shows an example of a report generated after a simulation application, particularly after the simulated paper has been printed.

The above characteristics, determined in a trial simulation application are shown in FIG. 5. In this figure, the user is provided with a display of ink penetration as it relates to strike-though. Like FIG. 4, the screen is divided into quadrants. In quadrant 200, the fabric used is displayed for comparison with the sheet formed thereon, which sheet is displayed in quadrant 202. Given that this is a printing simulation, the printing screen is also displayed, as in quadrant 204. The user selected a grid of 50 lines-per-inch, meaning that a row of 50 ink dots evenly spaced, will equal one inch if measured along a 45° angle. Below in quadrant 206, it is evident that the simulated sheet exhibits some strike through when subjected to a printing process.

The user, having analyzed the simulated sheet in any desired manner may return to block 22 and input different parameters relating to stock sample, fabric sample, sheet specifications and machine specifications to improve sheet quality, particularly the density distribution of the sheet. If the user is finished, such results may be saved or disposed of, as given in block 30.

While the invention has been particularly shown and described with reference to the aforementioned embodiments, it will be understood by those skilled in the art that various changes in form and detail may be made therein without departing from the spirit and scope of the invention. Thus, any modification of the shape, configuration and composition of the elements comprising the invention is within the scope of the present invention.

We claim:

1. A system for simulating the formation process of a fibrous sheet comprising:

a plurality of databases having means for storing parameters relating to sheet formation, a configuring base having means for relating input data to said plurality of databases, means for interactively eliciting said input data from a user, simulating means, interacting with said configuring base, for producing at least one simulation of at least a portion of a sheet, and means for displaying said at least one simulation.

2. The system for simulating the formation of a sheet as in claim 1, said input data comprising information relating to at least one stock sample.

3. The system for simulating the formation of a sheet as in claim 1, said input data comprising information relating to at least one fabric upon which said simulation of at least a portion of a sheet is formed.

4. The system for simulating the formation of a sheet as in claim 1, said input data comprising information relating to at least one papermaking machine.

5. The system for simulating the formation of a sheet as in claim 1, said input data comprising information relating to at least one printing process.

6. The system for simulating the formation of a sheet as in claim 1, said means for simulating further having means for producing a simulation of at least a portion of a fabric sample.

7. The system for simulating the formation of a sheet as in claim 1, said means for simulating further having means for producing a simulation of at least a portion of a sheet having printing thereon.

8. The system for simulating the formation of a sheet as in claim 1, said means for simulating further having means for producing a simulation of the density of said sheet.

9. The system for simulating the formation of a sheet as in claim 1, said means for simulating further having means for producing a simulation of the surface of said sheet.

10. The system for simulating the formation of a sheet as in claim 1, said means for simulating further having means for producing a simulation of a grid used for printing said sheet.

11. The system for simulating the formation of a sheet as in claim 1, said means for simulating further having means for producing a simulation of ink penetration on said sheet.

12. A system for simulating the formation of a paper sheet comprising:

at least one database containing rules that relate papermaking characteristics to a paper sheet, a computer comprising means for interacting with said database, means for receiving input from a user, and means for processing said input with said rules so as to generate simulation signals, means for receiving said simulation signals and displaying a simulated representation of the formation of a paper sheet.

13. The system for simulating the formation of a paper sheet, as in claim 12, said at least one database further comprising data relating to a plurality of different headbox stock samples.

14. The system for simulating the formation of a paper sheet, as in claim 12, said at least one database further comprising data relating to a plurality of different forming fabrics.

15. The system for simulating the formation of a paper sheet as in claim 12, said at least one database further comprising data relating to a plurality of different papermaking machines.

16. The system for simulating the formation of a paper sheet as in claim 12, said at least one database further comprising data relating to a plurality of different printing processes.

17. The system for simulating the formation of a paper sheet as in claim 12 further comprising means for providing a hard copy of said simulated representation.

18. The system for simulating the formation of a paper sheet as in claim 12 further comprising means for providing means for transmitting said simulation signals to a remote location.

19. The system for simulating the formation of a paper sheet as in claim 12, said input comprising at least one of the following parameters, stock sample, fabric sample, papermaking machine and printing process.

20. The system for simulating the formation of a paper sheet as in claim 19, said simulating signals containing data relating to the characteristics of the fibers constituting the sheet.

21. The system for simulating the formation of a paper sheet as in claim 20, said simulating signals further containing data relating to the distribution of fibers in said stock sample which constitute the sheet.

22. The system for simulating the formation of a paper sheet as in claim 20, said simulating signals further containing data relating to the percentage of fibers retained on said fabric sample.

23. The system for simulating the formation of a .paper sheet as in claim 20, said means for receiving said simulating signals and displaying, further having means for displaying at least one of the following sheet characteristics; density, porosity, surface characteristics, and structure.

24. A method for simulating the formation of a paper sheet comprising;

creating at least one database containing rules that relate papermaking characteristics to a paper sheet, providing a computer for interacting with said database, and for receiving input from a user, processing said input from a user with said rules so as to generate simulation signals, providing simulation signals, displaying a simulated representation of the formation of a paper sheet based on said simulation signals.

25. The method for simulating the formation of a paper sheet as in claim 24, said input further comprising data relating to the elements required to produce a paper sheet.

26. The method for simulating the formation of a paper sheet as in claim 24, said elements being at least one of the following; a stock sample, a fabric sample, a papermaking machine, and a printing process.

27. The method for simulating the formation of a paper sheet as in claim 26, further comprising;

displaying an image of fibers in said stock sample as said fibers create a sheet, and displaying an image of the final sheet.

28. The method for simulating the formation of a paper sheet as in claim 26 further comprising, providing a digital representation of a distribution of fibers in said stock sample which constitute the sheet.

29. The method for simulating the formation of a paper sheet as in claim 26 further comprising, providing a digital representation of the percentage of fibers retained on said fabric sample.

30. The method for simulating the formation of a paper sheet as in claim 24 further comprising, providing a representation of at least one of the following characteristics of the sheet; density, porosity, surface characteristics, and structure.

* * * * *